United States Patent
Fontanella et al.

[11] 3,901,911
[45] Aug. 26, 1975

[54] PYRROLO[1,2-C]IMIDAZOLE-1-ONE DERIVATIVES

[75] Inventors: Luigi Fontanella, Milan; Emilio Occelli, Parabiago, both of Italy

[73] Assignee: Gruppo Lepetit S.p.A., Milan, Italy

[22] Filed: Oct. 26, 1973

[21] Appl. No.: 409,985

[30] Foreign Application Priority Data
Nov. 3, 1972  Italy................................. 31275/72

[52] U.S. Cl. ............ 260/309.7; 260/326.8; 424/273
[51] Int. Cl.² ......................................... C07D 49/34
[58] Field of Search .............................. 260/309.7

[56] References Cited
FOREIGN PATENTS OR APPLICATIONS
46-16990  11/1971  Japan.............................. 260/309.7

*Primary Examiner*—Ethel G. Love
*Attorney, Agent, or Firm*—Theodore Post; C. Kenneth Bjork

[57] ABSTRACT

Pyrrolo[1,2-c]imidazole derivatives of the formula

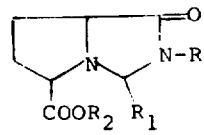

wherein R is a lower alkyl, a phenyl or a benzyl radical, $R_1$ is hydrogen, a lower alkyl or a phenyl radical and $R_2$ is hydrogen or a lower alkyl radical. The compounds have C.N.S. activity.

6 Claims, No Drawings

PYRROLO[1,2-C]IMIDAZOLE-1-ONE DERIVATIVES

SUMMARY OF THE INVENTION

The present invention relates to pharmacologically active pyrrolo[1,2-c]imidazole derivatives represented by formula (I)

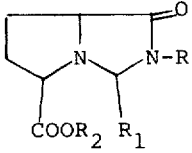

wherein R represents a lower alkyl, a phenyl or a benzyl radical, $R_1$ represents hydrogen, a lower alkyl or a phenyl radical and $R_2$ represents hydrogen or a lower alkyl radical.

In the specification and claims the terms "lower alkyl" and "lower alkoxy" designate alkyl and alkoxy groups respectively, containing from 1 to 4 carbon atoms; the terms "a phenyl" and "a benzyl" designate phenyl and benzyl groups, respectively, which may be substituted by one or two lower alkoxy groups.

DESCRIPTION OF THE PREFERRED EMBODIMENTS

The compounds of the present invention are prepared by contacting a 2,5-disubstituted pyrrolidine represented by formula (II)

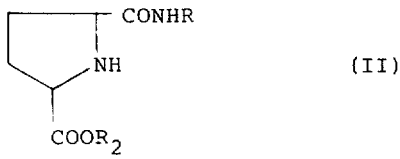

wherein R and $R_2$ have the significance given before, with at least an equimolecular amount of an aldehyde represented by the formula $R_1$—CHO in which $R_1$ has the meaning given before, in an anhydrous inert organic solvent advantageously selected from the lower halogenated hydrocarbons, xylene, tetrahydrofuran and the like, in the presence of an acidic catalyst, such as, for example, para-toluenesulfonic acid. The reaction is carried out by heating the reaction mixture, preferably at the boiling temperature of the solvent, for a period of time ranging from about 3 to 7 hours. The reaction product is then recovered and purified following usual procedures in organic preparative chemistry, e.g., the crude compound may be freed from any undesired by-product by column chromatography and further purified by crystallization or distillation under reduced pressure, depending on whether the compound is a solid or an oily substance.

The following additional description and examples further describe the invention and the manner and process of making and using it to enable the art skilled to make and use the same and set forth the best mode contemplated by the inventors of carrying out the invention.

EXAMPLE 1

2-Benzyl-5-carbethoxy-3-propyl-hexahydro-1H-pyrrolo[1,2-c]imidazole-1-one

A mixture of 5 g. (0.0181 mole) of 2-benzylcarbamyl-5-carbethoxypyrrolidine, 2.3 g. (0.032 mole) of butyraldehyde and 0.6 g. (0.0035 mole) of p-toluenesulfonic acid, in 80 ml. of anhydrous xylene was refluxed for 5 hours in a Markusson apparatus. After cooling, the reaction mixture was washed twice with dilute aqueous sodium hydrogen carbonate. The organic layer was then dried over sodium sulfate and the solvent was distilled off in vacuo. The residue obtained was chrmatographed through silica-gel using benzene containing 5% of acetone as the eluent. Fractions of 100 ml. were collected. From the fractions 7 through 10, a product was obtained which was distilled under reduced pressure to give 3.8 g. of the pure titular compound, b.p. 185°–187°C./0.4 mm Hg.

EXAMPLES 2–11

The following compounds were prepared pursuant to the procedure described in the previous example:

2. 5-Carbethoxy-2-(p-methoxyphenyl)-3-phenyl-hexahydro-1H-pyrrolo[1,2-c]imidazolene-1-one from 5-carbethoxy-2-(p-methoxyphenyl)carbamylpyrrolidine and benzaldehyde, yield 69.3%, m.p. 115°–116°C. (from diethyl ether).

3. 5-Carbethoxy-3-(3,4-dimethoxyphenyl)-2-(p-methoxyphenyl)-hexahydro-1H-pyrrolo[1,2-c]imidazolene-1-one from 5 carbethoxy-2-(p-methoxyphenyl)carbamylpyrrolidine and 3,4-dimethoxybenzaldehyde, yield 67.9%, b.p. 250°C./0.4 mm Hg.

4. 5-Carbethoxy-2-(p-methoxyphenyl)-3-propyl-hexahydro-1H-pyrrolo[1,2-c]imidazolene-1-one, from 5 carbethoxy-2-(p-methoxyphenyl)carbamylpyrrolidine and butyraldehyde, yield 71.8%, b.p. 190°C./0.4 mm Hg.

5. 5-Carbethoxy-2-phenyl-hexahydro-1H-pyrrolo[1,2-c]imidiazolene-1-one from 5 carbethoxy-2-phenylcarbamylpyrrolidine and formaldehyde, yield 42%, b.p. 198°–200°C./0.4 mm Hg.

6. 2-Benzyl-5-carbethoxy-3-phenyl-hexahydro-1H-pyrrolo-[1,2-c]imidazolene-1-one from 2-benzylcarbamyl-5-carbethoxy-pyrrolidine and benzaldehyde, yield 23.8%, m.p. 56°–57°C. (from ethanol/diethyl ether).

7. 2-Benzyl-5-carbethoxy-3-(3,4-dimethoxyphenyl)-hexahydro-1H-pyrrolo[1,2-c]imidazolene-1-one from 2-benzylcarbamyl-5-carbethoxypyrrolidine and 3,4-dimethoxybenzaldehyde, yield 68%, b.p. 238°–240°C./0.4 mm Hg.

8 and 9. 5-Carbethoxy-2-methyl-3-propyl-hexahydro-1H-pyrrolo[1,2-c]imidazolene-1-one α-isomer and 5-carbethoxy-2-methyl-3-propyl-hexahydro-1H-pyrrolo[1,2-c]imidazolene-1-one β-isomer were prepared as a mixture of the two isomers starting from 5-carbethoxy-2-(methylcarbamyl)pyrrolidine and butyraldehyde. They were separated by column chromatography and characterized by NMR techniques.

α-isomer: yeild 31%, b.p. 144°–146°C./0.5 mm Hg.
β-isomers: yield 21%, b.p. 143°–146°C./0.5 mm Hg.

10. 5-Carbethoxy-2-methyl-3-phenyl-hexahydro-1H-pyrrolo-[1,2-c]imidazolene-1-one from 5-carbethoxy-2-methylcarbamyl-pyrrolidine and benzaldehyde, yield 50%, b.p. 173°–175°C./0.5 mm Hg.

11. 5-Carbethoxy-3-(3,4-dimethoxyphenyl)-2-methyl-hexahydro-1H-pyrrolo[1,2-c]imidazolene-1-one from 5-carbethoxy-2-(methylcarbamyl)pyrrolidine and 3,4-dimethoxybenzaldehyde, yield 72,4%, b.p. 210°C./0,4 mm Hg.

Pursuant to the methods described by Cignarella and Nathansohn in Journal Organic Chemistry 26, 1500, 1961, and by Cignarella and Testa in Gazzetta Chimica Italiana, 92, 1093, 1962, the following representative starting compounds of formula (II) were prepared, generally as a mixture of the two cis- and trans-isomers:

two possible isomers. In this case, the end compounds of formula (I) will be a mixture of the two possible isomers, α- and β-, which may be separated with the aid of well known techniques, for example, by column chromatography. It is to be noted, that even if the starting material as the mixture of the two possible isomers is used, the formation of a mixture of the α- and β-compounds is not necessarily obtained. Owing to the presence of several asymmetry centers, the compounds of formula (I) may also be mixtures of optical isomers: there can theoretically be four isomers when $R_1$ is hy-

| Compound | M.P.°C.,C. B.P.°C./mm Hg. |
|---|---|
| 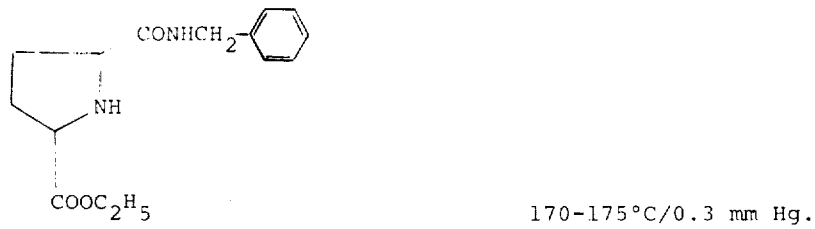 | 170-175°C/0.3 mm Hg. |
| 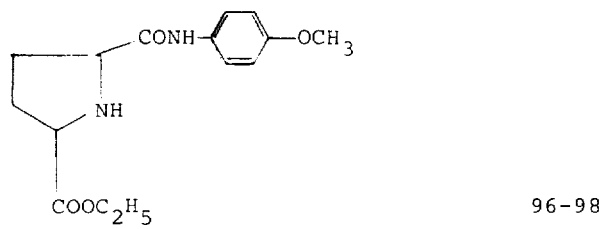 | 96-98 |
| 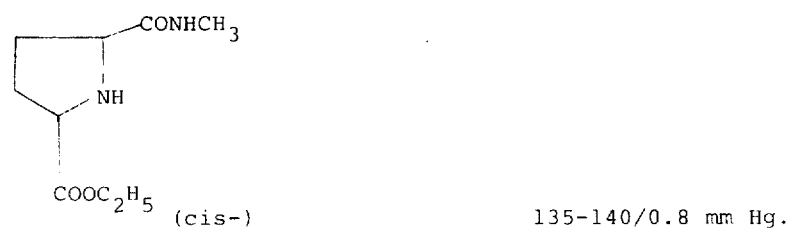 | 135-140/0.8 mm Hg. |
| 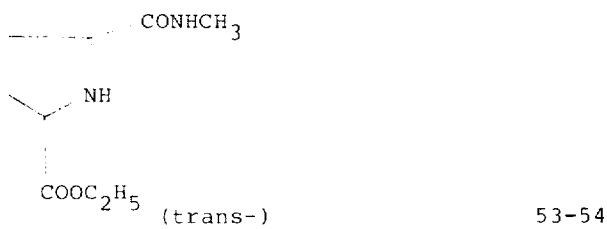 | 53-54 | t is obvious that the two isomers may be separated and characterized, as shown in the Examples, for the compounds of formula (II) wherein R is $CH_3$. Thus, if, as the starting material, the cis- or the trans-form of the compound of formula (II) is employed, a product of formula (I) will be obtained, which will hereinafter be called the β-isomer if it is derived from a pyrrolidine of formula (II) having the cis-structure, or the α-isomer if it is derived from a pyrrolidine of formula (II) having the trans-structure. However, it is preferred to use as the starting materials for the subsequent condensation step with the aldehyde of formula (III) mixtures of the drogen, as then two asymmetry centers are present at positions 5 and 8, or eight when $R_1$ is other than hydrogen, since in this case there are then three asymmetry centers at positions 3, 5 and 8. It is therefore obvious that the final products may be separated into the possible pairs of enantiomers.

The compounds of the invention have central nervous system (C.N.S.) activity. This activity was evaluated by investigating the behavior of mice and rats after administering an effective dose of one of the compounds. A decrease of the spontaneous activity in mice was taken as a measure of the sedative effect, while an impairment of motor coordination and righting reflex were related to hypnotic properties. The myorelaxing characteristics were evaluated by considering the muscular tone, and the anxiety relieving effect was measured on the basis of the secondary conditioned avoidance response in rats. In representative operations, amounts of about 50 mg/kg i.p. of representative compounds of Examples 2, 5, 7, 8 and 10 were found to be active on the above mentioned parameters.

The favorable biological properties are coupled with a very low toxicity, since the $LD_{50}$ values are always higher than 1000 mg/kg i.p. in mice.

What is claimed is:

1. A compound represented by the formula

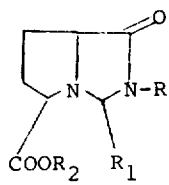

wherein R is selected from the group consisting of a lower alkyl, a phenyl and a benzyl radical, $R_1$ is selected from the group consisting of hydrogen, a lower alkyl and a phenyl radical, wherein the phenyl and benzyl radicals of R and $R_1$ may be substituted by one or two lower alkoxy groups, and $R_2$ is selected from the group consisting of a hydrogen atom and a lower alkyl radical.

2. The compound of claim 1 which is 5-carbethoxy-2-(p-methoxyphenyl)-3-phenyl-hexahydro-1H-pyrrolo[1,2-c]-imidazolene-1-one.

3. The compound of claim 1 which is 5-carbethoxy-2-phenyl-hexahydro-1H-pyrrolo[1,2-c]imidazolene-1-one.

4. The compound of claim 1 which is 2-benzyl-5-carbethoxy-3-(3,4-dimethoxyphenyl)-hexahydro-1H-pyrrolo[1,2-c]-imidazolene-1-one.

5. The compound of claim 1 which is α-5-carbethoxy-2-methyl-3-propyl-hexahydro-1H-pyrrolo[1,2-c]imidazolene-1-one.

6. The compound of claim 1 which is 5-carbethoxy-2-methyl-3-phenyl-hexahydro-1H-pyrrolo[1,2-c]imidazolene-1-one.

* * * * *

UNITED STATES PATENT AND TRADEMARK OFFICE
CERTIFICATE OF CORRECTION

PATENT NO. : 3,901,911
DATED : August 26, 1975
INVENTOR(S) : L. Fontanella, et al.

It is certified that error appears in the above-identified patent and that said Letters Patent are hereby corrected as shown below:

Column 2, line 14, "chrmatographed" should read --chromatographed--;

Column 2, line 25, "imidazolene" should read --imidazole--;

Column 2, line 31, "imidazolene" should read --imidazole--;

Column 2, line 36, "imidazolene" should read --imidazole--;

Column 2, line 41, "imidiazolene" should read --imidazole--;

Column 2, line 45, "imidazolene" should read --imidazole--;

Column 2, line 50, "imidazolene" should read --imidazole--;

Column 2, line 55, "imidazolene" should read --imidazole--;

Column 2, line 57, "imidazolene" should read --imidazole--;

Column 2, line 63, "isomers" should read --isomer--;

Column 2, line 65, "imidazolene" should read --imidazole--;

UNITED STATES PATENT AND TRADEMARK OFFICE
CERTIFICATE OF CORRECTION

PATENT NO. : 3,901,911
DATED : August 26, 1975
INVENTOR(S) : L. Fontanella, et al.

It is certified that error appears in the above-identified patent and that said Letters Patent are hereby corrected as shown below:

Column 3, line 2, "imidazolene" should read --imidazole--;

Column 6, line 10, "imidazolene" should read --imidazole--;

Column 6, line 12, "imidazolene" should read --imidazole--;

Column 6, line 16, "imidazolene" should read --imidazole--;

Column 6, line 19, "imidazolene" should read --imidazole--;

Column 6, line 22, "imidazolene" should read --imidazole--.

Signed and Sealed this second Day of March 1976

[SEAL]

Attest:

RUTH C. MASON
Attesting Officer

C. MARSHALL DANN
Commissioner of Patents and Trademarks